United States Patent [19]

Suzuki et al.

[11] 4,325,569
[45] Apr. 20, 1982

[54] EMERGENCY LOCKING DEVICE

[75] Inventors: Ichiro Suzuki, Nagoya; Masanao Motonami; Hisashi Ogawa, both of Toyota, all of Japan

[73] Assignee: Toyota Jidosha Kogyo Kabushiki Kaisha, Toyota, Japan

[21] Appl. No.: 184,881

[22] Filed: Sep. 8, 1980

[30] Foreign Application Priority Data

Sep. 13, 1979 [JP] Japan .................... 54-126811

[51] Int. Cl.³ .......................................... A62B 35/02
[52] U.S. Cl. ................................. 280/804; 297/469
[58] Field of Search .............. 280/802, 804, 808, 801; 297/469, 471, 472, 483

[56] References Cited

U.S. PATENT DOCUMENTS

| | | | |
|---|---|---|---|
| 4,159,848 | 7/1979 | Manz et al. | 297/483 |
| 4,200,308 | 4/1980 | Irwin et al. | 280/804 |
| 4,223,915 | 9/1980 | Tanaka et al. | 280/804 |
| 4,241,939 | 12/1980 | Suzuki et al. | 280/804 |

*Primary Examiner*—Joseph F. Peters, Jr.
*Assistant Examiner*—Ross Weaver
*Attorney, Agent, or Firm*—Stevens, Davis, Miller & Mosher

[57] ABSTRACT

One end of an occupant restraining webbing is secured to a slider, and driving means moves said slider in a guide groove formed in a guide rail, so that an occupant can be automatically brought into a webbing fastened state. The slider, being provided at the head thereof with a shoe, moves smoothly. Said shoe is adapted to be damaged under a predetermined value of load in an emergency of the vehicle, so that the head of slider can be pressed against said guide groove to prevent the slider from moving, thereby securing the occupant in the restrained state.

10 Claims, 5 Drawing Figures

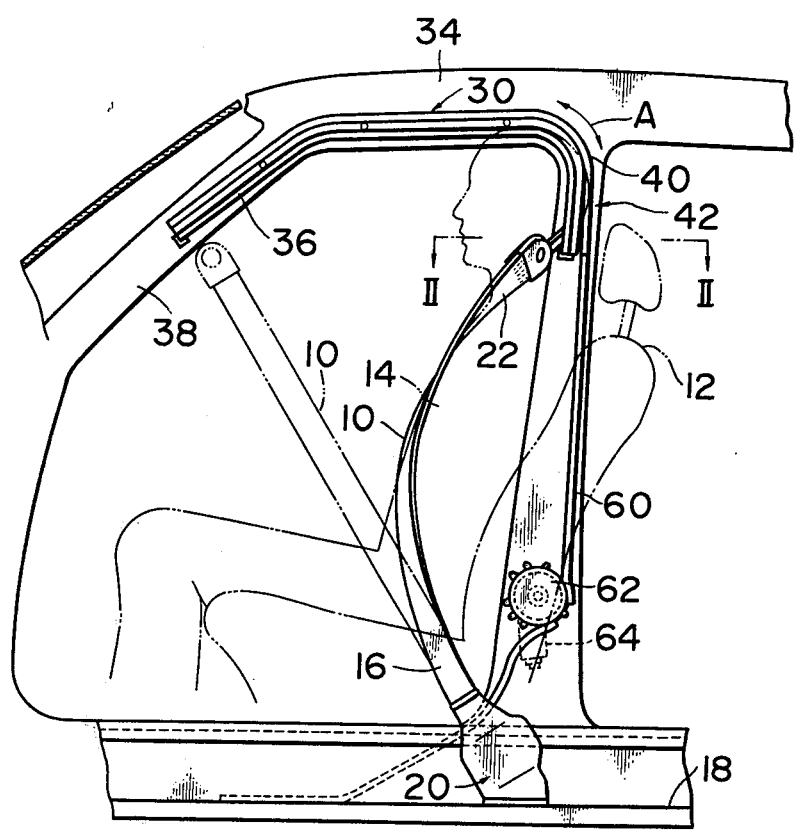

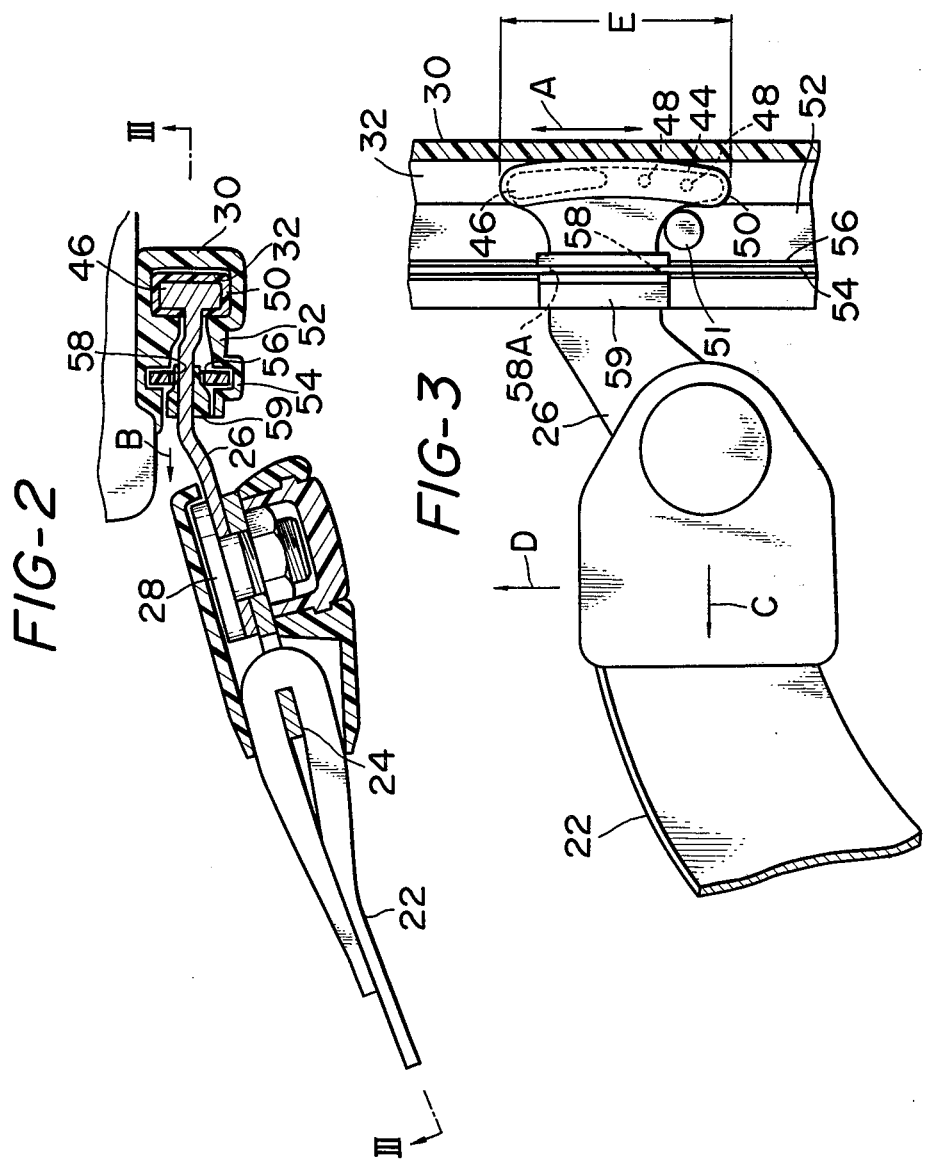

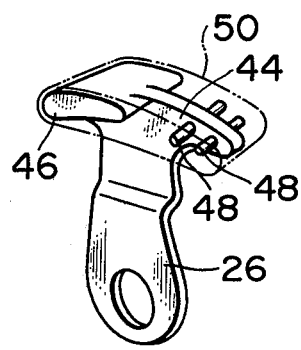
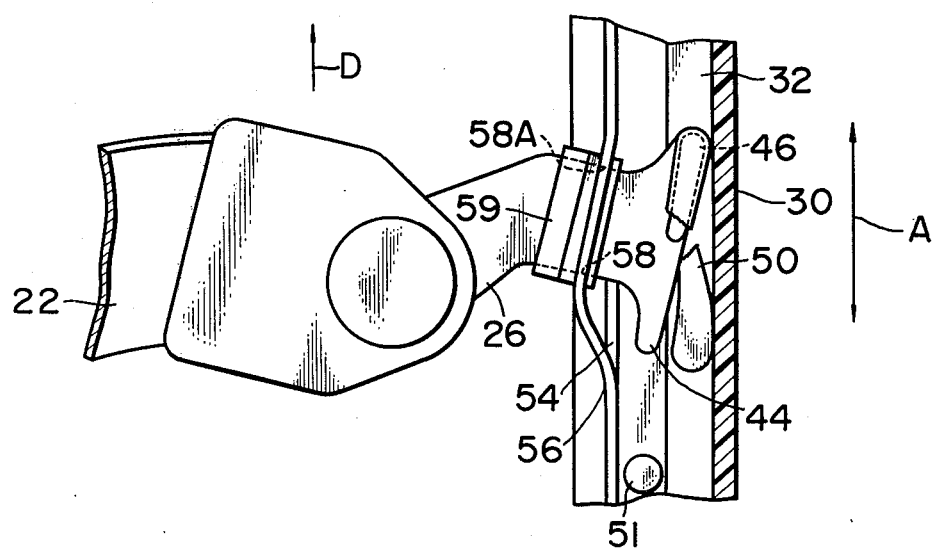

EMERGENCY LOCKING DEVICE

BACKGROUND OF THE INVENTION

1. Field of the Invention

This invention relates to an emergency locking device used in a seatbelt system for reliably locking an occupant restraining webbing in an emergency of a vehicle.

2. Description of the Prior Art

Heretofore, there has been proposed a seatbelt system for automatically fastening a restraining webbing to an occupant after he has been seated. In said seatbelt system, a slider is slidably guided in a guide rail laid on a vehicle body, an outer end of the webbing is secured to said slider, and the slider is driven along the guide rail, whereby the outer end of the webbing is caused to approach or recede from an occupant's seat, thereby fastening the webbing to or unfastening same from the seated occupant.

In said automatically fastening type seatbelt system, it is necessary that said slider should be positively engaged with the vehicle body at an automatically fastening position to which said slider reaches after moving in a direction of the occupant's seat along the guide rail. More particularly, in an emergency of the vehicle such as a collision, overturn or the like of the vehicle, a high tension is generated in the webbing due to a colliding inertial force of the occupant. Hence, it is necessary to make the vehicle body reliably support the tension, so that the occupant can be reliably restrained by the webbing.

From this reason, heretofore, there has been proposed means of preventing the slider from moving by use of a locking device such as a solenoid driven by an electric power source of the vehicle when the slider reaches the automatically fastening position. However, such means has been complex in construction and tended to cause an unexpected accident due to interruption of power supply in a collision of the vehicle.

SUMMARY OF THE INVENTION

The present invention has been developed to obviate the abovedescribed disadvantages and has as its object the provision of an emergency locking device, wherein, in an emergency of the vehicle, the slider is reliably prevented from moving so as to hold the occupant in a restrained state.

In the emergency locking device according to the present invention, a shoe is secured to a head of a slider, whereby the head of slider in its longitudinal direction is disposed in a guide groove of the guide rail, and, the shoe is adapted to be broken away under a predetermined value of load to make the head of slider rotatable in the guide groove, so that the slider can be prevented from moving due to the frictional force generated between the head and the guide groove, thus securing the occupant in a restrained state.

Description will hereunder be given of an embodiment of the present invention with reference to the drawings.

BRIEF DESCRIPTION OF THE DRAWINGS

FIG. 1 is a side view showing an embodiment of the emergency locking device according to the present invention;

FIG. 2 is a sectional view taken along the line II—II in FIG. 1;

FIG. 3 is a sectional view taken along the line III—III in FIG. 2;

FIG. 4 is a perspective view showing the condition of the shoe being secured to the slider; and FIG. 5 shows the emergency locking device of FIG. 3 in an active position.

DECRIPTION OF THE PREFERRED EMBODIMENT

In the present embodiment as shown in FIG. 1, a webbing 10 for restraining an occupant is obliquely, surroundingly fastened to the occupant 14 seated at an occupant's seat 12. An inner end portion 16 of said webbing 10 is wound up by a retractor 20 secured to a floor member 18 provided at the substantially central portion of the vehicle. Said retractor 20 is adapted to wind up the webbing 10 by a biasing force thereof and incorporates therein an inertia lock mechanism for suddenly stopping the windoff of the webbing in an emergency of the vehicle.

On the other hand, an outer end portion 22 of the webbing 10, as shown in FIGS. 2 and 3, is turned back at an anchor plate 24 and sewn onto itself, thus being engaged with said anchor plate 24. Said anchor plate 24 is rotatably secured to a slider 26 through a bolt 28.

The slider 26 is received and guided in a guide groove 32 being substantially rectangular in cross section, which is cuttingly provided in a guide rail 30 in the longitudinal direction thereof, and movable along said guide groove 32 in the longitudinal direction of the guide rail 30. The central portion of the guide rail 30 is laid on a roof side 34 of the vehicle in the substantially horizontal direction, the forward end portion 36 of the guide rail 30 descends along a front pillar 38, and a vertical portion 40 at the rear end of the guide rail 30 is bent at a substantially right angle with said central portion, and thereafter, hangs down along a center pillar 42. Here, when the slider 26 and the anchor plate 24 reach the lower end of said vertical portion 40 as indicated by solid lines in FIG. 1, an automatic fastening position is attained which enables the webbing 10 to be surroundingly attached to the occupant 14. Furthermore, when the slider 26 reaches the forward end portion 36 of the guide rail 30, the webbing 10 is separated from the occupant's seat 12 and moved forward in the vehicle as indicated by two-dot chain lines in FIG. 1, and an unfastening position is attained which enables to form a space for the occupant to enter or leave the vehicle.

As shown in FIG. 4, in order to be secured to said guide rail 30, the slider is constructed such that one end portion of the slider 26 is formed to provide an enlarged portion 44 larger in width than the intermediate portion thereof, a flat head 46 is projected from one end of said enlarged portion 44 in the direction of the wall thickness thereof, and said flat head 46 is made slightly smaller in width than the width of the guide groove 32 as shown in FIG. 3.

A pair of shear pins 48 penetrate the other end of said enlarged portion 44 across the wall thickness of the slider 26. Furthermore, a flat-type shoe 50 larger in size than the flat head 46 is integrally molded on the slider 26 in a manner to enclose both the flat head 46 and the shear pins 48 of the enlarged portion 44 as indicated by two-dot chain lines in FIG. 4. Said shoe 50 is made substantially equal in width to the guide groove 32 as shown in FIG. 3, so that a frictional force generated between the shoe 50 and the guide groove 32 can be reduced when the slider 26 moves along the guide rail 30 in directions indicated by a double-headed arrow A.

With the flat head 46 and shoe 50 thereof being restrained by a neck portion 52 of the guide rail 30 as shown in FIG. 2 and the enlarged portion 44 being engaged with the stop pin 51, the slider 26 will not be withdrawn from the guide groove 32 even in the case a tension acts on the webbing 10.

In this case, the tension of the webbing 10 imparted to the slider 26 acts in a direction of the flat head 46 being withdrawn from the shoe 50 (a direction indicated by an arrow B in FIG. 2), however, as far as the occupant fastened with the webbing 10 observes the ordinary behavior in the compartment, the shoe 50 may not be damaged. In case a tension of the webbing 10 generated by the inertial force of the occupant 14 acts on the slider 26 in an emergency of the vehicle such as a collision, the shear pins 48 may be shorn and the shoe 50 may be damaged. Due to said damage, the flat head 46 may be turned in the guide groove 32 as shown in FIG. 5.

As shown in FIG. 2, the guide rail 30 is penetratingly provided in the longitudinal direction thereof with a tape groove 54 continuous to the guide groove 32 through the neck porion 52 thereof, said tape groove 54 receiving therein a flexible tape 56. Said tape 56 is penetratingly provided in the longitudinal direction thereof with a multiplicity of openings 58, one opening of which receives the intermediate portion of the slider 26 through a guide shoe 59, whereby the slider 26 is engaged with the tape 56. As shown in FIG. 1, said tape 56 is guided in an auxiliary slide rail 60 descending along the center pillar from the lower end of the vertical portion thereof, and the lower end portion of said auxiliary slide rail 60 is communicated with a sprocket housing 62 secured to the lower portion of the center pillar 42, whereby said tape 56 is guided into said sprocket housing 62. A sprocket, not shown, is pivotally supported in said sprocket housing, and the opening 58 of the tape 56 is meshed with said sprocket.

Said sprocket in the sprocket housing 62 is adapted to be driven by an electric motor 64 secured to the center pillar 42, and said motor 64 is adapted to detect the seated condition of the occupant to move the tape 56 along the guide rail 30. Here, the motor 64 is shown as an example, which is adapted to move the anchor plate 24 to the webbing unfastening position when the occupant opens the door, and move the anchor plate 24 to the webbing fastening position when the occupant closes the door.

In this embodiment with the arrangement as described above, if the occupant opens the door to leave the vehicle, then the motor 64 drives the tape 56, whereby the slider 26 moves in the guide rail 30, so that the webbing 10 can be moved to the webbing unfastening position as indicated by two-dot chain lines in FIG. 1. In consequence, the occupant can readily leave the vehicle. When the occupant closes the door after he has been seated in the vehicle, the motor 64 is reversely operated to move the slider 26 along the guide rail 30 to the automatic webbing fastening position.

In this condition, the occupant can be automatically fastened with the webbing 10 as indicated by solid lines in FIG. 1. Furthermore, in the case the vehicle has fallen into an emergency such as a collision, the inertia lock mechanism in the retractor 20 is actuated to suddenly stop the windoff of the webbing 10, and moreover, the slider 26 is in the vertical portion 40 of the guide rail 30, whereby the enlarged portion 44 is engaged with the neck portion 52 and the stop pin 51 of the guide rail 30 so as to prevent the slider 26 from moving forward in the vehicle (in a direction indicated by an arrow C in FIG. 3), so that the occupant 14 can be reliably restrained by the webbing 10, thereby securing the occupant in safety. In this case, the slider 26 abuts against the stop pin 51 or the neck portion 52 of the guide rail 30, whereby the tension of the webbing 10 is supported, so that high shear force may not act on the shear pins 48, thus enabling to prevent the shoe 50 from being damaged.

Furthermore, in case the vehicle is turned over, a load acts on the anchor plate 24 upward in the vehicle (in a direction indicated by an arrow D), whereby the slider 26 tends to move upward in the vehicle. However, the tape 56 is stopped at this time, a reaction force is generated in said tape 56, whereby the slider 26 is turned about the end portion 58A disposed unwardly in the vehicle of the opening 58 of the tape 56 (Refer to FIG. 3), so that the shear pins 48 are broken off by a high shear force acting thereon. At the same time, the shoe 50 is damaged, whereby the flat head 46 is turned in the guide groove 32 as shown in FIG. 5.

The flat head 46 is turned in the guide groove 32 and part of the head 46 abuts against the guide groove 32 as described above, whereby the slider 26 is prevented from moving along the guide rail 30 in a direction indicated by an arrow D, thus securing the occupant in the restrained condition. In this case, the shorter the length of the shoe 50 along the guide groove 32 (a dimension E shown in FIG. 3) is, the easier the shoe 50 and the shear pins 48 can be damaged, even if the abovedescribed reaction force generated in the tape 56 is small.

If the occupant opens the door when he wants to leave the vehicle after the normal running of the vehicle, then the motor 64 drives the tape 56, whereby the slider 26 is moved to the webbing unfastening position, so that the occupant can automatically unfasten the webbing from his body.

As has been described hereinabove, the emergency locking device according to the present invention can offer such an excellent advantage that the flat head of the slider provided thereon with a shoe is guided in the guide groove of the guide rail and further, under a predetermined value of load, the shoe is damaged to make the flat head rotatable, so that the occupant can be reliably restrained in the automatic webbing fastened state by use of the emergency locking device of simplified construction, thereby enabling to improve the safety for the occupant.

What is claimed is:

1. An emergency locking device used in a seatbelt system of a vehicle for locking the movement of an occupant restraining webbing in the event of an emergency situation, comprising:
   (a) a guide rail laid on the vehicle body and provided therein in the longitudinal direction with a guide groove;
   (b) a slider, which is engaged with the occupant restraining webbing and having a flat head which is inserted into said guide groove;
   (c) driving means for moving said slider along the guide rail so as to automatically fasten the webbing to the occupant when seated; and
   (d) a shoe secured to the head of said slider for aligning the head of the slider in its longitudinal direction with the guide groove of the guide rail and being damaged under a predetermined value of load to make said head rotatable in the guide groove, whereby the head of said slider is pressed against the guide groove to prevent the slider from moving in the guide groove in the longitudinal direction.

2. An emergency locking device as set forth in claim 1, wherein said driving means exerts the driving force thereof on a portion of the slider close to the occupant restraining webbing rather than the head of slider.

3. An emergency locking device as set forth in claim 2, wherein said driving means has a flexible tape for receiving the driving force of a motor, and the intermediate portion of slider is inserted into one of a plurality of openings formed in said tape in its longitudinal direction so as to receive said driving force.

4. An emergency locking device as set forth in claim 3, wherein said tape moves in a tape groove provided in the guide rail in parallel with said guide groove.

5. An emergency locking device as set forth in claim 1, wherein said head is flat and projects in a direction of the well thickness of the slider to be received in said guide groove.

6. An emergency locking device as set forth in claim 5, wherein said head is formed at one end of an enlarged portion provided on one end portion of said slider.

7. An emergency locking device as set forth in claim 6, wherein said shoe covers said enlarged portion entirely.

8. An emergency locking device as set forth in claim 7, wherein said shoe covers said head with one part thereof and shear pins penetrating said enlarged portion with the other part thereof, and, in the event of an emergency situation, most of said shear pins fall off said enlarged portion due to the damage thereof so as to expose said head and make it possible for same to come into contact with the guide groove.

9. An emergency locking device as set forth in claim 8, wherein one end portion of said guide rail descends along a center pillar of the vehicle.

10. An emergency locking device used in a seatbelt system, wherein a restraining webbing is automatically fastened to or unfastened from an occupant when he enters or leaves a vehicle, for preventing the webbing from moving in an emergency situation of the vehicle, comprising:
(a) a guide rail which is laid on a roof side of the vehicle in the longitudinal direction of the vehicle and a vehicle-rear end portion of which is bent toward a floor;
(b) a guide groove formed in said guide rail in the longitudinal direction thereof;
(c) a slider, one end of which is formed into a head to be received in said guide groove and the other end of which is engaged with the occupant restraining webbing;
(d) a tape groove formed in the guide rail in its longitudinal direction at a portion closer to the webbing than said guide groove;
(e) a flexible tape, which is received in said tape groove and a portion of which is engaged with the intermediate portion of said slider;
(f) driving means for moving said tape in the longitudinal direction of the guide rail to the automatic webbing fastening position or the automatic webbing unfastening position; and
(g) a shoe provided on the head of said slider and brought into contact with the guide groove for reducing frictional resistance generated between the slider and the guide groove when the slider moves, whereby said shoe is damaged under a predetermined value of load to make it possible for said head to come into pressing contact with the guide groove, so that the slider can be prevented from moving in the longitudinal direction of the guide rail, thereby securing the occupant in the restrained state.

* * * * *